US012604111B2

(12) United States Patent     (10) Patent No.:   US 12,604,111 B2

Lim     (45) Date of Patent:   Apr. 14, 2026

(54) IMAGE SENSING DEVICE FOR OBTAINING HIGH DYNAMIC RANGE IMAGE AND IMAGING DEVICE INCLUDING THE SAME

(71) Applicant: SK hynix Inc., Icheon-si (KR)

(72) Inventor: Hyun Soo Lim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 152 days.

(21) Appl. No.: 18/345,948

(22) Filed: Jun. 30, 2023

(65) Prior Publication Data

US 2024/0031694 A1    Jan. 25, 2024

(30) Foreign Application Priority Data

Jul. 19, 2022   (KR) ......................... 10-2022-0089001

(51) Int. Cl.
   *H04N 25/59*     (2023.01)
   *H04N 25/51*     (2023.01)
   *H04N 25/57*     (2023.01)
   *H04N 25/772*    (2023.01)

(52) U.S. Cl.
   CPC ............. *H04N 25/59* (2023.01); *H04N 25/51* (2023.01); *H04N 25/57* (2023.01); *H04N 25/772* (2023.01)

(58) Field of Classification Search
   CPC ........ H04N 25/59; H04N 25/51; H04N 25/57; H04N 25/772
   See application file for complete search history.

(56) References Cited

U.S. PATENT DOCUMENTS

| | | | |
|---|---|---|---|
| 8,426,796 B2 | 4/2013 | Mao et al. | |
| 9,888,191 B2 | 2/2018 | Beck | |
| 2015/0189199 A1* | 7/2015 | Borremans | H04N 25/59 |
| | | | 348/250 |
| 2016/0316163 A1* | 10/2016 | Beck | H04N 25/59 |
| 2021/0250530 A1* | 8/2021 | Paik | H04N 25/78 |

* cited by examiner

*Primary Examiner* — Nicholas G Giles

(74) *Attorney, Agent, or Firm* — Perkins Coie LLP

(57) ABSTRACT

An imaging device includes a plurality of image sensing pixels to generate pixel signals indicative of detected incident light, an analog-to-digital converter coupled to receive the pixel signals from the image sensing pixels and configured to convert the pixel signals into image data representing an image in the detected incident light, and an image signal processor coupled to receive the image data and configured to generate a high dynamic range image based on the image data. Each of the image sensing pixels includes a photoelectric conversion element configured to generate photocharge corresponding to the detected incident light at the image sensing pixel, a floating diffusion region coupled to the photoelectric conversion element to accumulate the generated photocharge, and a dual conversion gain circuit that includes a PMOS transistor and is coupled to the floating diffusion region to provide additional capacitance to the floating diffusion region.

17 Claims, 10 Drawing Sheets

IMAGE SENSING DEVICE FOR OBTAINING HIGH DYNAMIC RANGE IMAGE AND IMAGING DEVICE INCLUDING THE SAME

PRIORITY CLAIM AND CROSS-REFERENCE TO RELATED APPLICATION

This patent document claims the priority and benefits of Korean patent application No. 10-2022-0089001, filed on Jul. 19, 2022, the disclosure of which is incorporated herein by reference in its entirety as part of the disclosure of this patent document.

TECHNICAL FIELD

The technology and implementations disclosed in this patent document generally relate to an image sensing device capable of generating image data by sensing light, and an imaging device including the same.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IoT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image sensing device capable of obtaining a high dynamic range (HDR) image, and an imaging device including the same.

In some embodiments of the disclosed technology, an imaging device may include a plurality of image sensing pixels structured to detect incident light to generate pixel signals indicative of the detected incident light on the plurality of image sensing pixels, respectively, an analog-to-digital converter coupled to receive the pixel signals from the image sensing pixels and configured to convert the pixel signals into image data representing an image in the detected incident light, and an image signal processor coupled to receive the image data and configured to generate a high dynamic range image based on the image data, wherein each of the image sensing pixels includes a photoelectric conversion element configured to generate photocharge corresponding to the detected incident light at the image sensing pixel, a floating diffusion region coupled to the photoelectric conversion element to accumulate the generated photocharge, and a dual conversion gain circuit that includes a P-channel Metal Oxide Semiconductor (PMOS) transistor and is coupled to the floating diffusion region to provide additional capacitance to the floating diffusion region.

In some embodiments of the disclosed technology, an image sensing device may include a plurality of image sensing pixels, each image sensing pixel detect incident light to generate a pixel signal indicative of the detected incident light, and an analog-to-digital converter configured to convert the pixel signal into image data, wherein each of the image sensing pixels includes a photoelectric conversion element configured to generate photocharge corresponding to the detected incident light, a floating diffusion region configured to accumulate the generated photocharge at the floating diffusion region, and a P-channel Metal Oxide Semiconductor (PMOS) transistor coupled to the floating diffusion region to produce a dual conversion gain and to provide additional capacitance to the floating diffusion region.

In some embodiments of the disclosed technology, an image sensing device may include a photoelectric conversion element configured to detect incident light to generate photocharge corresponding to the detected incident light, a floating diffusion region coupled to the photoelectric conversion element to accumulate the generated photocharge at the floating diffusion region, and a dual conversion gain transistor configured to provide additional capacitance to the floating diffusion region, and including a gate connected to the floating diffusion region.

In some embodiments of the disclosed technology, an imaging device may include an image sensing device including a plurality of pixels, each of which generates a pixel signal having a magnitude corresponding to illuminance, and an analog-to-digital converter (ADC) configured to convert the pixel signal into image data. Each pixel may include a photoelectric conversion element configured to generate photocharges corresponding to the illuminance, a floating diffusion region configured to accumulate the generated photocharges, a dual conversion gain (DCG) transistor implemented by using a PMOS transistor that provides additional capacitance to the floating diffusion region, and an image signal processor (ISP) configured to generate a high dynamic range (HDR) image using the image data.

In some embodiments of the disclosed technology, an image sensing device may include a plurality of pixels, each of which generates a pixel signal having a magnitude corresponding to illuminance, and an analog-to-digital converter (ADC) configured to convert the pixel signal into image data. Each pixel may include a photoelectric conversion element configured to generate photocharges corresponding to the illuminance, a floating diffusion region configured to accumulate the generated photocharges, and a dual conversion gain (DCG) transistor implemented by using a PMOS transistor that provides additional capacitance to the floating diffusion region.

In some embodiments of the disclosed technology, an image sensing device may include a photoelectric conversion element configured to generate photocharges corresponding to illuminance, a floating diffusion region configured to accumulate the generated photocharges, and a dual conversion gain (DCG) transistor configured to provide additional capacitance to the floating diffusion region, and having a gate connected to the floating diffusion region.

It is to be understood that both the foregoing general description and the following detailed description of the disclosed technology are illustrative and explanatory and are intended to provide further explanation of the disclosure as claimed.

DETAILED DESCRIPTION

This patent document provides implementations and examples of an imaging device capable of generating image data by sensing light that may, in some applications, be used in certain configurations to substantially address one or more technical or engineering issues to mitigate limitations or disadvantages encountered in some other image sensing devices. Some implementations of the disclosed technology relate to an image sensing device capable of obtaining a high dynamic range (HDR) image, and an imaging device including the same. The disclosed technology provides various implementations of an image sensing device which can obtain a high dynamic range (HDR) image by pressing the shutter only once using pixels that automatically change their mode to another mode.

Hereafter, various embodiments are described with reference to the accompanying drawings. However, it should be understood that the implementations of the disclosed technology are not limited to those specific embodiments, but can include various modifications, equivalents and/or alternatives of the embodiments. The embodiments of the disclosed technology may provide a variety of effects capable of being directly or indirectly recognized through the disclosed technology.

Figure 1:
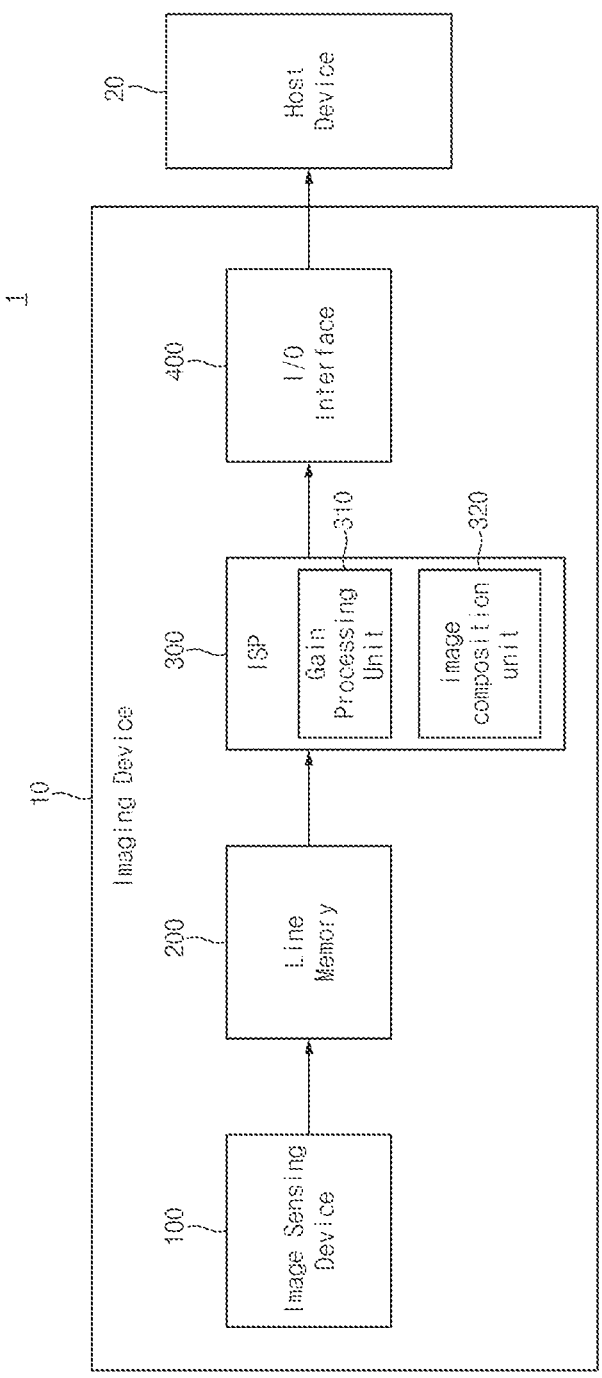
FIG. 1 is a block diagram illustrating an example of an imaging device based on some implementations of the disclosed technology.
Figure 2:
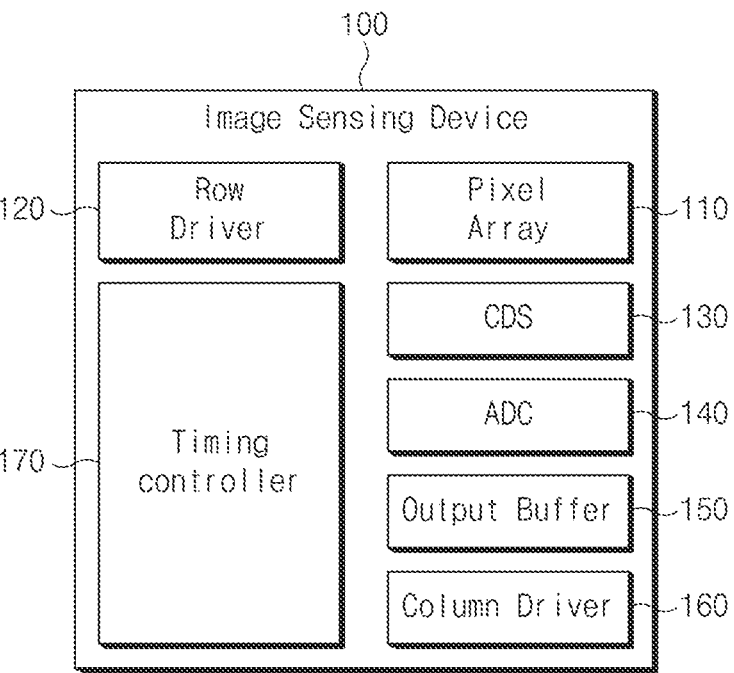
FIG. 2 is a block diagram illustrating an example of an image sensing device shown in FIG. 1 based on some implementations of the disclosed technology.

FIG. 1 is a block diagram illustrating an example of an imaging system 1 based on some implementations of the disclosed technology. FIG. 2 is a block diagram illustrating an example of an image sensing device shown in FIG. 1.

Referring to FIG. 1, the imaging system 1 may refer to a device, for example, a digital still camera for photographing still images or a digital video camera for photographing moving images. For example, the imaging device 10 may be implemented as a Digital Single Lens Reflex (DSLR) camera, a mirrorless camera, or a smartphone, and others. The imaging device 10 may include a device having both a lens and an image pickup element such that the device can capture (or photograph) a target object and can thus create an image of the target object.

The imaging system 1 may include an imaging device 10 and a host device 20.

The imaging device 10 may include an image sensing device 100, a line memory 200, an image signal processor (ISP) 300, and an input/output (I/O) interface 400.

The image sensing device 100 may be a complementary metal oxide semiconductor image sensor (CIS) for converting light into electrical signals. The image sensing device 100 may control overall operations, such as on/off switching, operation mode switching, operation timing setting, and sensitivity setting, by the ISP 300. The image sensing device 100 may provide the line memory 200 with image data obtained by converting light into electrical signals in response to control signals of the ITSP 300.

Referring to FIG. 2, the image sensing device 100 may include a pixel array 110, a row driver 120, a correlated double sampler (CDS) 130, an analog-digital converter (ADC) 140, an output buffer 150, a column driver 160, and a timing controller 170. The components of the image sensing device 100 illustrated in FIG. 2 are discussed by way of example only, and this patent document encompasses numerous other changes, substitutions, variations, alterations, and modifications.

The pixel array 110 may include a plurality of imaging pixels arranged in rows and columns. In one example, the plurality of imaging pixels can be arranged in a two dimensional pixel array including rows and columns. In another example, the plurality of imaging pixels can be arranged in a three dimensional pixel array. The plurality of imaging pixels may convert an optical signal into an electrical signal on a unit pixel basis or a pixel group basis, where the imaging pixels in a pixel group share at least certain internal circuitry. The pixel array 110 may receive pixel control signals, including a row selection signal, a pixel reset signal and a transfer signal, from the row driver 120. Upon receiving the pixel control signals, corresponding imaging pixels in the pixel array 110 may be activated to perform the operations corresponding to the row selection signal, the pixel reset signal, and the transfer signal. Each of the imaging pixels may generate photocharges corresponding to the intensity (or illuminance) of incident light, may generate an electrical signal corresponding to the amount of photocharges, thereby sensing the incident light. For convenience of description, the imaging pixel may also be referred to as a pixel.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row driver 120 may sequentially enable the pixel reset signal for resetting imaging pixels corresponding to at least one selected row, and the transfer signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node. The reference signal indicating unique reset noise of each pixel and the image signal indicating the intensity of incident light may be generically called a pixel signal as necessary.

The image sensing device 100 may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. That is, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. In some embodiments of the disclosed technology, the ADC 140 may convert the correlate double sampling signal generated by the CDS 130 for each of the columns into a digital signal, and output the digital signal.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the column driver 160 and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

Referring back to FIG. 1, the line memory 200 may include a volatile memory (e.g., DRAM, SRAM, etc.) and/or a non-volatile memory (e.g., a flash memory). The line memory 200 can store image data corresponding to a predetermined number of lines. In this case, the line may refer to a row of the pixel array 110, and the predetermined number of lines may be less than a total number of rows of the pixel array 110. In some implementations, the line memory 200 may be a line memory capable of storing image data corresponding to some rows (or some lines) of the pixel array 110, rather than a frame memory capable of storing image data corresponding to a frame captured by the pixel array 110. In some implementations, the imaging device 10 may include a frame memory, instead of or in addition to the line memory 200.

The line memory 200 may receive image data from the image sensing device 100, may store the received image data, and may transmit the stored image data to the ISP 300 based on the control of the ISP 300.

The ISP 300 may perform image processing of the image data stored in the line memory 200. The ISP 300 may reduce noise of image data, and may perform various kinds of image signal processing (e.g., gamma correction, color filter array interpolation, color matrix, color correction, color enhancement, lens distortion correction, etc.) for image-quality improvement of the image data. In addition, the ISP 300 may compress image data that has been created by execution of image signal processing for image-quality improvement, such that the ISP 300 can create an image file using the compressed image data. Alternatively, the ISP 300 may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created. For example, the image files may be created according to Exchangeable image file format (Exif) standards.

In order to generate the HDR image, the ISP 300 may include a gain processing unit 310, and an image composition unit 320.

The gain processing unit 310 may determine a gain that is applied to image data. The gain processing unit 310 may determine a gain according to a difference in a conversion gain between a high conversion gain (HCG) mode and a low conversion gain (LCG) mode, and may provide the determined gain to the image composition unit 320. The gain may be experimentally determined in advance according to the sensitivity difference and other conditions, and may be stored in the gain processing unit 310. In some implementations, the gain processing unit 310 may store the experimentally determined gain in a table, such that the gain processing unit 310 may acquire a necessary gain corresponding to image data by referring to the experimentally determined gain in the table.

Each pixel of the pixel array 110 may operate in any one of an HCG mode and an LCG mode, and a mode of each pixel may be determined by the intensity (or illuminance) of light incident upon each pixel. The HCG mode may refer to a mode in which a pixel has a relatively large conversion gain, and the LCG mode may refer to a mode in which a pixel has a relatively small conversion gain. Here, the conversion gain may refer to a ratio of the level (e.g., voltage) of a pixel signal obtained by converted photocharge to the amount of photocharge generated in each pixel. Since the amount of charge generated in the pixel is proportional to the illuminance of each pixel, the HCG mode may refer to a mode in which the change of the pixel signal affected by the change of illuminance is relatively large, and the LCG mode may refer to a mode in which the change of the pixel signal affected by the change of illuminance is relatively small.

In other words, the slope (gradient) of the pixel signal with respect to pixel illuminance in the HCG mode may be different from the slope of the pixel signal with respect to pixel illuminance in the LCG mode. The gain may be a correction value for adjusting the slope of the pixel signal (or image data) with respect to illuminance of the pixel operating in the HCG mode to be equal to the slope of the pixel signal (or image data) with respect to illuminance of the pixel operating in the LCG mode.

The image composition unit 320 may synthesize the HDR image corresponding to a high dynamic range using image data of the pixel operating in the HCG mode and/or image data of the other pixel operating in the LCG mode.

In some embodiments of the disclosed technology, the image composition unit 320 may perform a calculation, using the gain provided from the gain processing unit 310, on the image data of the pixel operating in the HCG mode and/or the image data of the other pixel operating in the LCG mode, and may allow the calculated image data to be formed as the HDR image.

The ISP 300 may transmit image data (e.g., HDR image data) obtained by such image signal processing to the I/O interface 400.

In some implementations of the disclosed technology, the gain processing unit 310 and the image composition unit 320 that are used to generate the HDR image may also be included in the image sensing device 100, rather than in the ISP 300.

The I/O interface 400 may perform a communication with the host device 20, and may transmit the image signal processed (ISP) image data to the host device 20. In some implementations, the I/O interface 400 may be implemented as, for example, a mobile industry processor interface (MIPI).

The host device 20 may be a processor (e.g., an application processor) for processing the ISP image data received from the imaging device 10, a memory (e.g., a non-volatile memory) for storing the ISP image data, or a display device (e.g., a liquid crystal display (LCD)) for visually displaying the ISP image data.

Figure 3:
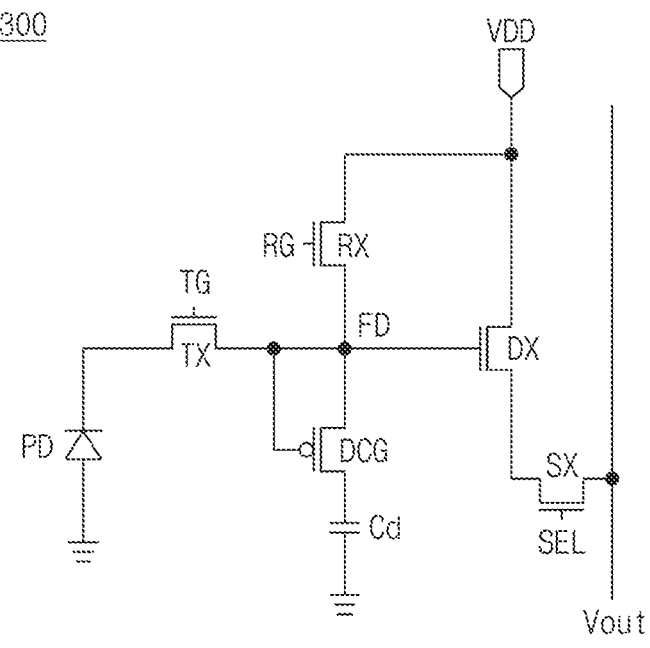
FIG. 3 is a circuit diagram illustrating an example of a pixel included in the pixel array of FIG. 2 based on some implementations of the disclosed technology.

FIG. 3 is a circuit diagram illustrating an example of the pixel included in the pixel array 110 of FIG. 2 based on some implementations of the disclosed technology.

Referring to FIG. 3, the pixel may correspond to an equivalent circuit of each pixel included in the pixel array 110.

Referring to FIG. 3, the pixel may include a photoelectric conversion element PD, a transfer transistor TX, a reset transistor RX, a floating diffusion region FD, a drive transistor DX, a select transistor SX, a dual conversion gain (DCG) transistor, and a DCG capacitor (Cd). That is, the pixel may have a 4TR (four-transistor) pixel structure.

The photoelectric conversion element PD may generate and accumulate photocharge corresponding to the intensity of incident light. For example, the photoelectric conversion element PD may be implemented as a photodiode, a phototransistor, a photogate, a pinned photodiode or a combination thereof. If the photoelectric conversion element PD is implemented as a photodiode, the photoelectric conversion element PD may be a region that is doped with second conductive impurities (e.g., N-type impurities) in a substrate including first conductive impurities (e.g., P-type impurities).

The transfer transistor TX may be coupled between the photoelectric conversion element PD and the floating diffusion region FD. The transfer transistor TX may be turned on or off in response to a transfer control signal TG. If the transfer transistor TX is turned on, photocharge accumulated in the photoelectric conversion element PD can be transmitted to the floating diffusion region FD.

The reset transistor RX may be disposed between the floating diffusion region FD and the power-supply voltage (VDD), and the voltage of the floating diffusion region FD can be reset to the power-supply voltage (VDD) in response to a pixel reset signal RG.

The floating diffusion region FD may accumulate photocharge received from the transfer transistor TX. For example, the floating diffusion region FD may be a region that is doped with second conductive impurities (e.g., N-type impurities) in a substrate (e.g., a P-type substrate) including first conductive impurities. In this case, the substrate and the impurity doped region can form a junction capacitor.

The drive transistor DX may be coupled between the power-supply voltage (VDD) and the select transistor SX, may amplify an electric potential difference of the floating diffusion region FD that has received photocharge from the photoelectric conversion element PD, and may transmit the amplified result to the select transistor SX.

The select transistor SX may be coupled between the drive transistor DX and the output signal line (or a column line), and may be turned on by a row selection signal SEL, so that the select transistor SX can output the electrical signal received from the drive transistor DX as a pixel signal (Vout).

A gate of the DCG transistor (DCG) may be coupled to the floating diffusion region FD. One terminal (e.g., a drain) of the DCG transistor (DCG) may be coupled to the floating diffusion region FD, and the other terminal (e.g., a source) of the DCG transistor (DCG) may be coupled to the DCG capacitor (Cd). As shown in FIG. 3, the transistors TX, RX, DX, and SX are implemented as NMOS (N-channel Metal Oxide Semiconductor) transistors, whereas the DCG transistor (DCG) may be implemented by using a PMOS (P-channel Metal Oxide Semiconductor) transistor. The DCG transistor (DCG) may be implemented to include a gate disposed over a substrate having first conductivity type impurities (e.g., P-type impurities), a well region doped with second conductivity type impurities (e.g., N-type impurities) formed to overlap the gate in the substrate, and a source/drain region doped with first conductivity type impurities (e.g., P-type impurities) such that at least a portion thereof can overlap each of both ends of the gate in the well region.

The DCG transistor (DCG) may be turned on or turned off in response to the voltage of the floating diffusion region FD connected to the gate thereof. That is, when the voltage of the floating diffusion region FD is lower than a threshold voltage of the DCG transistor (DCG), the DCG transistor (DCG) may be turned on, and when the voltage of the floating diffusion region FD is higher than the threshold voltage of the DCG transistor (DCG), the DCG transistor (DCG) may be turned off. The voltage of the floating diffusion region FD may be determined by the amount of photocharges transferred through the transfer transistor TX. The larger the amount of photocharge, the lower the voltage of the floating diffusion region FD.

The turned-on DCG transistor (DCG) additionally provides the floating diffusion region FD with capacitance corresponding to the sum of parasitic capacitance of the DCG transistor (DCG) and capacitance of the DCG capacitor (Cd). On the other hand, the turned-off DCG transistor (DCG) does not additionally provide the floating diffusion region FD with capacitance corresponding to the sum of parasitic capacitance of the DCG transistor (DCG) and capacitance of the DCG capacitor (Cd). That is, the capacitance of the floating diffusion region FD when the DCG transistor (DCG) is turned on may be larger than the capacitance of the floating diffusion region FD when the DCG transistor (DCG) is turned off.

Since the amount of photocharge is small at a relatively low illuminance, the voltage of the floating diffusion region FD is high (e.g., is equal to or higher than a threshold voltage) and the DCG transistor (DCG) is turned off, so that the capacitance of the floating diffusion region FD may be relatively low. Conversely, since the amount of photocharge is large at a relatively high illuminance, the voltage of the floating diffusion region FD is low (e.g., is lower than a threshold voltage) and the DCG transistor (DCG) is turned on, so that the capacitance of the floating diffusion region FD may be relatively high. That is, the capacitance of the floating diffusion region FD may be adjusted depending on whether illuminance is high or low.

Although each of the transfer signal TG, the pixel reset signal RG, and the row selection signal SEL may be applied from the row driver 120, the DCG transistor (DCG) may be operated without a separate control signal from the row driver 120. Therefore, a signal line is not required for a control signal to be applied to the DCG transistor (DCG), it is possible to secure, in the layout of an interconnect layer (e.g., a metal wiring layer), an extra space for signal lines that are used to carry electrical signals to or from the pixel array 110 and that overlap the pixel array 110, thereby suppressing a noise occurring between the signal lines resulting from a coupling phenomenon.

The DCG capacitor (Cd) may be a capacitor having a predetermined capacitance, and one terminal thereof may be coupled to the DCG transistor (DCG) and the other terminal thereof may be coupled to a ground voltage. The DCG capacitor (Cd) may include, for example, at least one of a Metal-Insulator-Metal (MIM) capacitor, a Metal-Insulator-Polysilicon (MIP) capacitor, a Metal-Oxide-Semiconductor (MOS) capacitor, or a junction capacitor.

In the pixel shown in FIG. 3, not only the capacitance corresponding to the parasitic capacitance of the DCG transistor (DCG), but also the capacitance corresponding to the capacitance of the DCG capacitor (Cd) is added to the floating diffusion region FD, and accordingly a relatively large capacitance may be provided to the floating diffusion region FD by adjusting the capacitance of the DCG capacitor (Cd).

Figure 4:
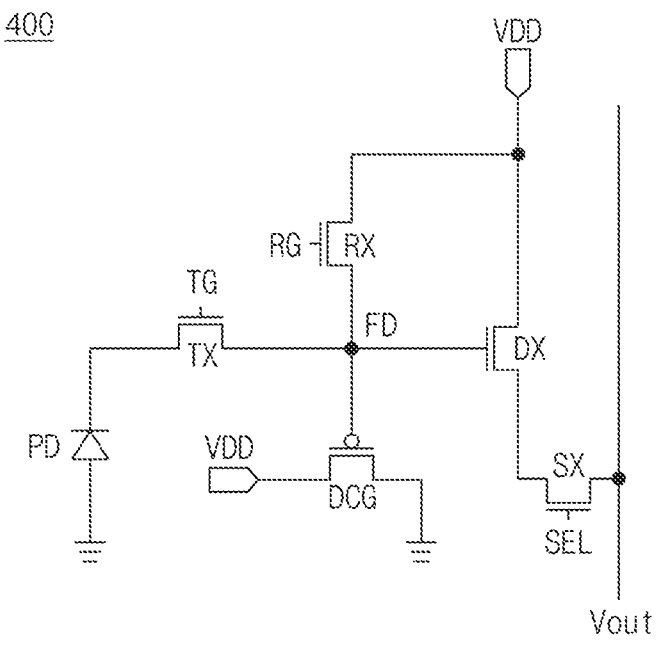
FIG. 4 is a circuit diagram illustrating another example of a pixel included in the pixel array of FIG. 2 based on some implementations of the disclosed technology.

FIG. 4 is a circuit diagram illustrating another example of a pixel included in the pixel array 110 of FIG. 2 based on some implementations of the disclosed technology.

Referring to FIG. 4, the pixel may correspond to an equivalent circuit of each pixel included in the pixel array 110.

Referring to FIG. 4, the pixel may include a photoelectric conversion element PD, a transfer transistor TX, a reset transistor RX, a floating diffusion region FD, a drive transistor DX, a select transistor SX, and a dual conversion gain (DCG) transistor. That is, the pixel may have a 4TR (four-transistor) pixel structure.

The structure and operation of the pixel shown in FIG. 4 are substantially the same as the structure and operation of the pixel shown in FIG. 3, and as such redundant description thereof will herein be omitted for brevity. For convenience of description, the constituent elements shown in FIG. 4 will hereinafter be described centering upon characteristics different from those of FIG. 3.

A gate of the DCG transistor (DCG) may be coupled to the floating diffusion region FD. One terminal (e.g., a drain) of the DCG transistor (DCG) may be coupled to the power-supply voltage (VDD), and the other terminal (e.g., a source) of the DCG transistor (DCG) may be coupled to a ground voltage. As shown in FIG. 4, the transistors TX, RX, DX, and SX are implemented as NMOS transistors, whereas the DCG transistor (DCG) may be implemented by using a PMOS transistor. The DCG transistor (DCG) may be implemented to include a gate disposed over a substrate having first conductivity type impurities (e.g., P-type impurities), a well region doped with second conductivity type impurities (e.g., N-type impurities) formed to overlap the gate in the substrate, and a source/drain region doped with first conductivity type impurities (e.g., P-type impurities) such that at least a portion thereof can overlap each of both ends of the gate in the well region.

The DCG transistor (DCG) may be turned on or turned off in response to the voltage of the floating diffusion region FD connected to the gate thereof. That is, when the voltage of the floating diffusion region FD is lower than a threshold voltage of the DCG transistor (DCG), the DCG transistor (DCG) may be turned on, and when the voltage of the floating diffusion region FD is higher than the threshold voltage of the DCG transistor (DCG), the DCG transistor (DCG) may be turned off. The voltage of the floating diffusion region FD may be determined by the amount of photocharges transferred through the transfer transistor TX. The larger the amount of photocharges, the lower the voltage of the floating diffusion region FD.

The turned-on DCG transistor (DCG) additionally provides the floating diffusion region FD with capacitance corresponding to the parasitic capacitance of the DCG transistor (DCG). On the other hand, the turned-off DCG transistor (DCG) does not additionally provide the floating diffusion region FD with capacitance corresponding to the parasitic capacitance of the DCG transistor (DCG). That is, the capacitance of the floating diffusion region FD when the DCG transistor (DCG) is turned on may be larger than the capacitance of the floating diffusion region FD when the DCG transistor (DCG) is turned off.

Since the amount of photocharge is small at a relatively low illuminance, the voltage of the floating diffusion region FD is high (e.g., is equal to or higher than a threshold voltage) and the DCG transistor (DCG) is turned off, so that the capacitance of the floating diffusion region FD may be relatively low. Conversely, since the amount of photocharges is large at a relatively high illuminance, the voltage of the floating diffusion region FD is low (e.g., is lower than a threshold voltage) and the DCG transistor (DCG) is turned on, so that the capacitance of the floating diffusion region FD may be relatively high. That is, the capacitance of the floating diffusion region FD may be adjusted depending on whether illuminance is high or low.

Although each of the transfer signal TG, the pixel reset signal RG, and the row selection signal SEL may be applied from the row driver 120, the DCG transistor (DCG) may be operated without a separate control signal from the row driver 120. Therefore, a signal line is not required for a control signal to be applied to the DCG transistor (DCG), it is possible to secure, in the layout of an interconnect layer (e.g., a metal wiring layer), an extra space for signal lines that are used to carry electrical signals to or from the pixel array 110 and that overlap the pixel array 110, thereby suppressing a noise occurring between the signal lines resulting from a coupling phenomenon.

In the pixel shown in FIG. 4, a fixed voltage (a ground voltage and a power-supply voltage) is applied to each of the terminals (source and drain) of the DCG transistor (DCG), the parasitic capacitance of the DCG transistor (DCG) depending on the voltage of the terminals (source and drain) of the DCG transistor (DCG) can be maintained constant. In addition, when the DCG transistor (DCG) is turned on, a constant capacitance may be provided to the floating diffusion region FD.

Figure 5:
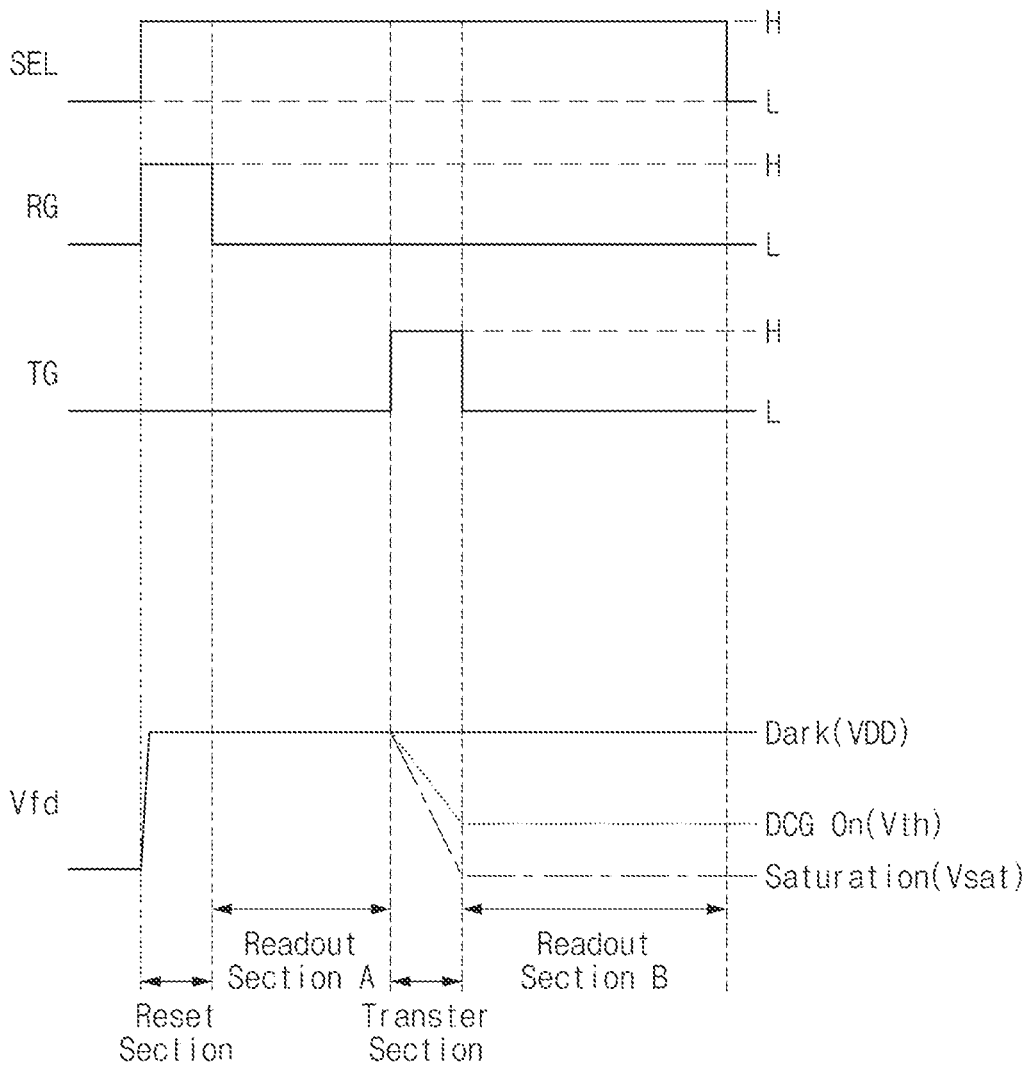
FIG. 5 is a timing diagram illustrating an example of operations of a pixel shown in FIG. 3 or FIG. 4 based on some implementations of the disclosed technology.

FIG. 5 is a timing diagram illustrating an example of operations of the pixel shown in FIG. 3 or FIG. 4 based on some implementations of the disclosed technology.

FIG. 5 illustrates a row selection signal SEL, a reset control signal RG, a transfer signal TG, and a floating diffusion region (FD) voltage (Vfd) to explain the operations of the pixel of FIG. 3 or the pixel of FIG. 4 according to lapse of time. Each of the row selection signal SEL, the reset control signal RG, and the transfer signal TG may have an activation voltage (H) or a deactivation voltage (L). When each of the row selection signal SEL, the reset control signal RG, and the transfer signal TG has the activation voltage (H), the corresponding transistors SX, RX, and TX may be turned on. Conversely, when each of the row selection signal SEL, the reset control signal RG, and the transfer signal TG has the deactivation voltage (L), the corresponding transistors SX, RX, and TX may be turned off.

The operation of the pixel of FIG. 3 or the pixel of FIG. 4 may include a reset section, a first readout section A, a transfer section, and a second readout section B. The row selection signal SEL may be maintained at the activation voltage (H) during these four sections.

In the reset section, the reset transistor RX may be turned on while the reset control signal RG has the activation voltage (H) so that the voltage of the floating diffusion region FD may be reset to the power-supply voltage (VDD).

In the first readout section, a reference signal that is an electrical signal corresponding to the reset floating diffusion region FD may be output through the drive transistor DX and the select transistor SX. Although FIG. 5 shows that the voltage of the floating diffusion region FD in the reset section and the voltage of the floating diffusion region FD in the first readout section are constant for convenience of description, the voltage of the floating diffusion region FD may vary depending on various factors (e.g., coupling between the floating diffusion region FD and other adjacent elements).

In the transfer section, the transfer transistor TX is turned on while the transfer signal TG has the activation voltage (H), so that photocharge of the photoelectric conversion element PD may move to the floating diffusion region FD.

Accordingly, the voltage (Vfd) of the floating diffusion region FD may vary depending on the amount of moving photocharge.

In the second readout section, as the movement of the photocharge is completed, the voltage (Vfd) of the floating diffusion region FD may have a voltage corresponding to the amount of photocharges.

When there are no photocharges transferred to the floating diffusion region FD (i.e., a dark state), the voltage (Vfd) of the floating diffusion region FD may be the same as the power-supply voltage (VDD).

When the amount of photocharges transferred to the floating diffusion region FD is greater than or equal to the maximum capacitance of the floating diffusion region FD (i.e., a saturation state), the voltage (Vfd) of the floating diffusion region FD may have a saturation voltage (Vsat) that is lower than the power-supply voltage (VDD) by a predetermined voltage. Here, the saturation voltage (Vsat) may be determined according to the maximum capacitance of the floating diffusion region FD, and the maximum capacitance of the floating diffusion region GD may refer to capacitance when the DCG transistor (DCG) is turned on and additional capacitance is provided to the floating diffusion region FD.

Compared to a case where there are no photocharges transferred to the floating diffusion region FD (i.e., a dark state), as the amount of photocharges increases, the voltage (Vfd) of the floating diffusion region FD may gradually decrease. When the voltage (Vfd) of the floating diffusion region FD becomes equal to the threshold voltage (Vth) of the DCG transistor (DCG), the DCG transistor (DCG) may be turned on to provide additional capacitance to the floating diffusion region FD (i.e., 'DCG On' state). As the capacitance of the floating diffusion region FD increases, the amount of photocharges may not exceed the capacitance of the floating diffusion region FD even if the amount of photocharges is further increased. That is, the floating diffusion region FD can accommodate more photocharges than the capacitance in a state in which no additional capacitance is provided (hereinafter, "first capacitance") to the floating diffusion region FD. Although the amount of photocharges exceeds the first capacitance, the voltage (Vfd) of the floating diffusion region FD may gradually decrease. However, the reduction width of the voltage (Vfd) of the floating diffusion region FD according to the amount of photocharges in a situation where the floating diffusion region FD has a first capacitance may be smaller than the reduction width of the voltage (Vfd) of the floating diffusion region FD according to the amount of photocharges in a situation where additional capacitance (hereinafter referred to as a second capacitance) is provided to the floating diffusion region FD. This is because the first capacitance is smaller than the second capacitance. As the capacitance of the floating diffusion region FD decreases, the change width in the voltage (Vfd) of the floating diffusion region FD according to the change in the amount of photocharges may increase.

When the floating diffusion region FD has the first capacitance, the pixel in FIG. 3 or the pixel in FIG. 4 may have a relatively large conversion gain. That is, a pixel in which the floating diffusion region FD has the first capacitance may be defined as a pixel operating in the HCG mode.

When the floating diffusion region FD has the second capacitance, the pixel in FIG. 3 or the pixel in FIG. 4 may have a relatively small conversion gain. That is, a pixel in which the floating diffusion region FD has the second capacitance may be defined as a pixel operating in the LCG mode.

In some implementations of the disclosed technology, when the capacitance of the floating diffusion region FD is the first capacitance, it is assumed that the voltage (Vfd) of the floating diffusion region FD in a situation where photocharges are maximally accumulated in the floating diffusion region FD is equal to a threshold voltage (Vth).

If the pixel of FIG. 3 or the pixel of FIG. 4 does not include the DCG transistor (DCG) and thus the capacitance of the floating diffusion region FD is fixed at the first capacitance, the voltage (Vfd) of the floating diffusion region FD may have a range between the power-supply voltage (VDD) and the threshold voltage (Vth).

However, as in the disclosed technology, when the capacitance of the floating diffusion region FD including the DCG transistor (DCG) is adjusted to the first capacitance or the second capacitance depending on the amount of photocharge, the voltage (Vfd) of the floating diffusion region FD may have a range between the power-supply voltage (VDD) and the saturation voltage (Vsat).

When the PMOS DCG transistor (DCG) is included in the image sensing device of the disclosed technology, the range for converting the amount of photocharge into an electrical signal corresponding to the amount of photocharge may be enlarged. As a result, a dynamic range, which is a range of illuminance in which a pixel has an effective response (e.g., a pixel signal or image data corresponding to the intensity of incident light), may be enlarged.

In addition, when the amount of photocharge increases, the PMOS DCG transistor (DCG) may be automatically turned on, so that the capacitance of the floating diffusion region FD increases and the amount of photocharge the floating diffusion region FD can accommodate increases, thereby preventing saturation. In contrast, when the amount of photocharge decreases, the PMOS DCG transistor (DCG) may be automatically turned off, so that the capacitance of the floating diffusion region FD decreases and the signal conversion can be performed using a high conversion gain, thereby improving a signal-to-noise (SNR) ratio.

Figure 6:
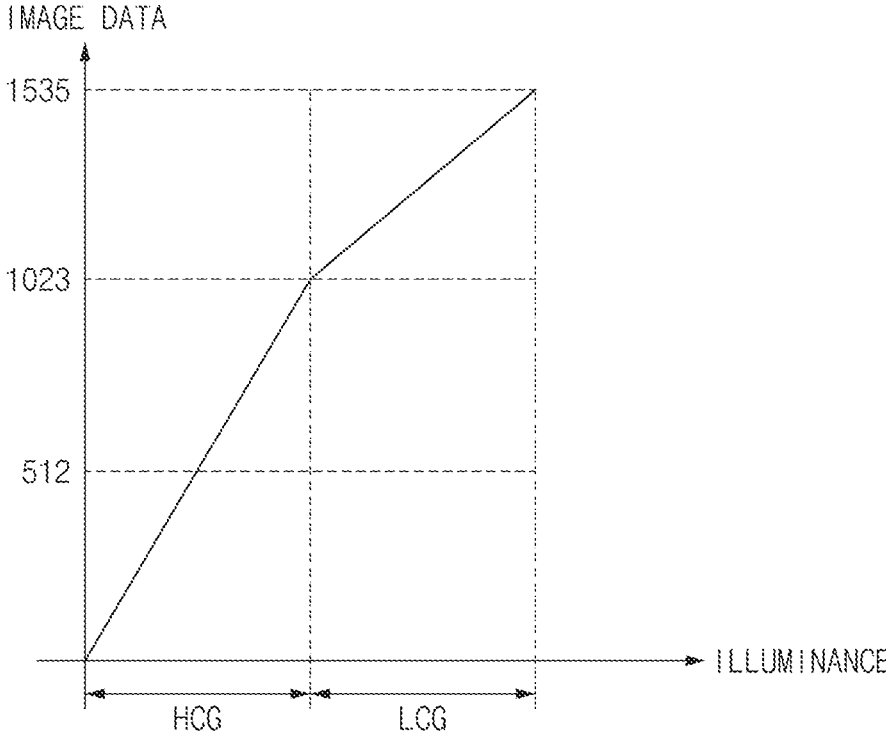
FIG. 6 is a graph illustrating an example of the relationship between illuminance and image data for each pixel based on some implementations of the disclosed technology.

FIG. 6 is a graph illustrating an example of the relationship between illuminance and image data for each pixel based on some implementations of the disclosed technology.

Referring to FIG. 6, a graph illustrating the relationship between image data generated by image sensing pixels and indicative of the intensity of incident light for each pixel of the pixel array 110 shown in FIG. 2 is illustrated. Hereinafter, the pixel may refer to the pixel of FIG. 3 or the pixel of FIG. 4. The image data generated by the pixel may refer to data obtained when a pixel signal output from the pixel is analog-to-digital converted by the ADC 140 after passing through the CDS 130.

Photocharge corresponding to the illuminance of light incident upon the image sensing pixel may be generated in the photoelectric conversion element PD, and the mode of the pixel may be determined according to the amount of the photocharge transferred to the floating diffusion region FD. In the example of FIG. 6, photocharge accumulated in the floating diffusion region FD corresponds to the image data 1023, the voltage (Vfd) of the floating diffusion region FD may correspond to the threshold voltage (Vth).

When the voltage (Vfd) of the floating diffusion region FD that has received the photocharge exceeds the threshold voltage (Vth), the floating diffusion region FD may have a first capacitance so that the image sensing pixel may operate in the HCG mode in which the conversion gain is relatively high. Accordingly, in the HCG mode, the slope of the graph corresponding to image data that is determined based on an increase in the amount of photocharge may be relatively large.

On the other hand, when the voltage (Vfd) of the floating diffusion region FD that has received photocharges is less than or equal to the threshold voltage (Vth), the floating diffusion region FD has a second capacitance so that the pixel can operate in the LCG mode in which the conversion gain is relatively low. Accordingly, in the LCG mode, an increase width (i.e., a slope) of image data according to an increase in the amount of photocharge may be relatively small.

In some implementations of the disclosed technology, it is assumed that the second capacitance is twice the first capacitance, and accordingly, the slope in the HCG mode may be twice the slope in the LCG mode.

Figure 7:
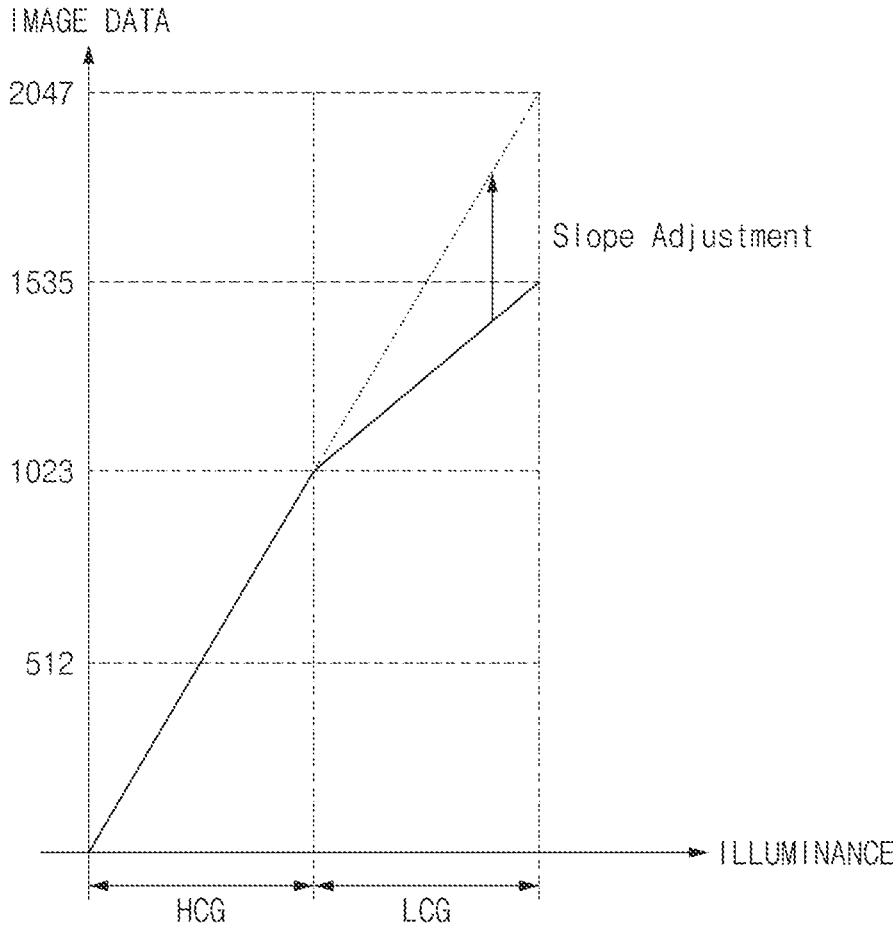
FIG. 7 is a graph illustrating an example of a method for allowing an image signal processor (ISP) to generate a high dynamic range (HDR) image using image data of FIG. 6 based on some implementations of the disclosed technology.

FIG. 7 is a graph illustrating an example of a method for allowing the image signal processor (ISP) to generate a high dynamic range (HDR) image using image data of FIG. 6 based on some implementations of the disclosed technology.

Referring to FIG. 7, it is assumed that the image sensing device 100 includes one ADC 140 that generates the image data of FIG. 6.

The ISP 300 may receive the image data of FIG. 6, and may determine whether the received image data is image data generated in any of the HCG mode and the LCG mode. That is, the gain processing unit 310 of the ISP 300 may determine the gain based on the value (or size) of the image data.

In the example of FIG. 7, when the value of the image data corresponds to 0 to 1022, the image data refers to image data generated in the HCG mode, so that the gain processing unit 310 may determine a gain that is applied to the image data to be '1'.

In addition, when the value of the image data corresponds to 1023 to 1535, the image data refers to image data generated in the LCG mode, the gain processing unit 310 may determine a gain that is applied to the image data to be '2'.

Here, the gain may be a correction value for slope adjustment for adjusting the slope of the graph of image data of the pixel operating in the HCG mode to be equal to the slope of image data of the pixel operating in the LCG mode. In addition, the reason why the gain of image data generated in the LCG mode is determined to be '1' and the gain of the image data generated in the HCG mode is not determined to be '½' is to reduce noise by increasing the range of image data with respect to the range of illuminance and by increasing the resolution of image data with respect to such illuminance.

In some implementations, the gain for image data generated in the HCG mode may be smaller than the gain for image data generated in the LCG mode.

The image composition unit 320 of the ISP 300 may generate an HDR image by calculating the gain provided from the gain processing unit 310 with respect to the image data of pixels operating in HCG mode and/or the image data of pixels operating in the LCG mode. For example, the above calculation (or operation) may be a multiplication operation, and when the gain is set to '1', the image composition unit 320 may omit the corresponding calculation (or operation). For example, the HDR image generated by the image composition unit 320 may have the range of 0 to 2047.

In other implementations, when whether the HCG mode or the LCG mode is applied to the pixel is determined based on control signals of an external device (e.g., the row driver), the ISP must separately synthesize each of the image data generated in the HCG mode and the image data generated in the LCG mode. In some embodiments of the disclosed technology, the ISP 300 may generate the HDR image by calculating a gain corresponding to the HCG mode or a gain corresponding to the LCG mode with respect to only one image data generated by only one image capture (e.g., pressing the shutter only once), without separately synthesizing each of the image data generated in the HCG mode and the image data generated in the LCG mode, thereby greatly improving the operation speed of the image sensing device. In addition, the ISP 300 may sense scenes at different viewpoints, thereby reducing or minimizing motion artifacts or motion blur caused by the movement of a target object rapidly moving from one place to another place.

Figure 8A:
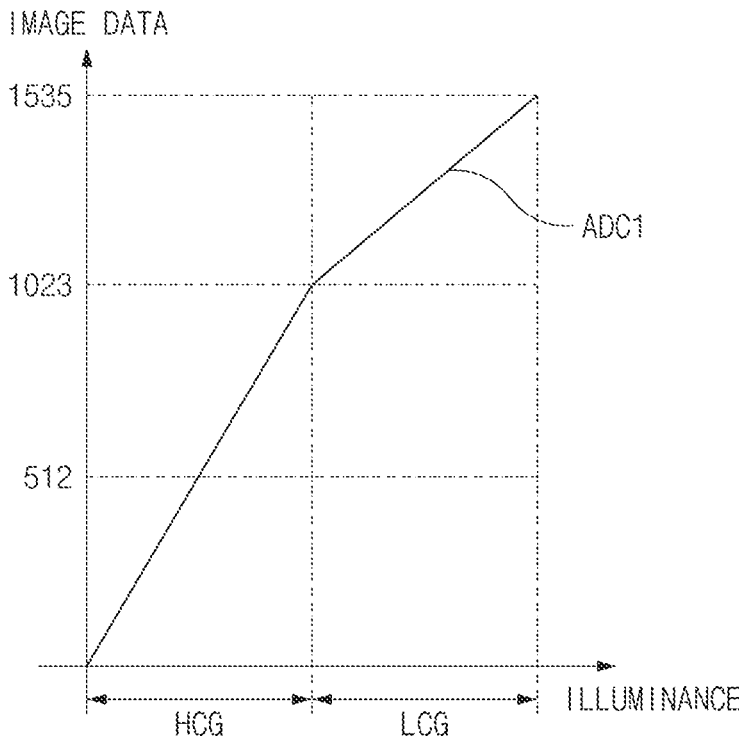
FIGS. 8A to 8C are graphs illustrating other examples of a method for allowing the image signal processor (ISP) to generate a high dynamic range (HDR) image using image data of FIG. 6 based on some implementations of the disclosed technology.
Figure 8B:
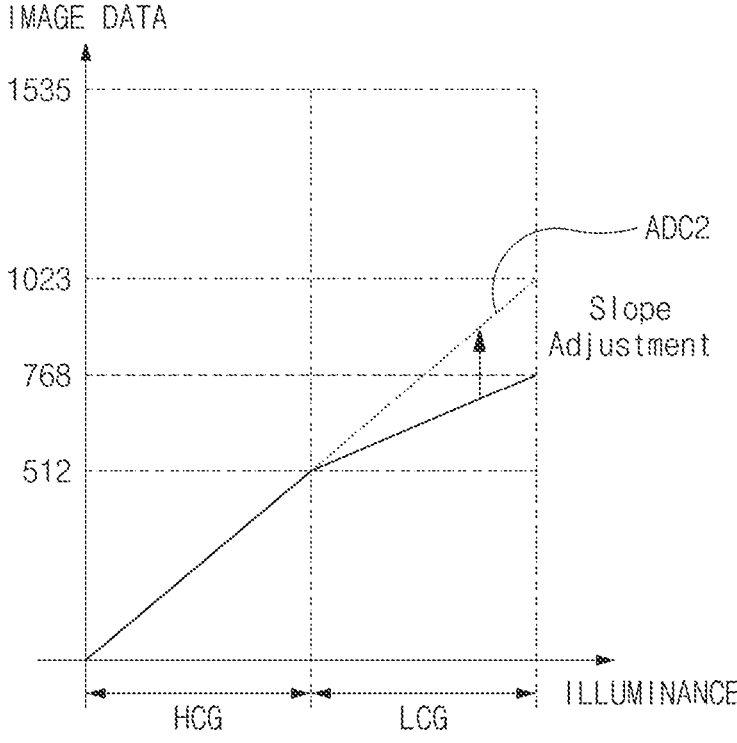
Figure 8C:
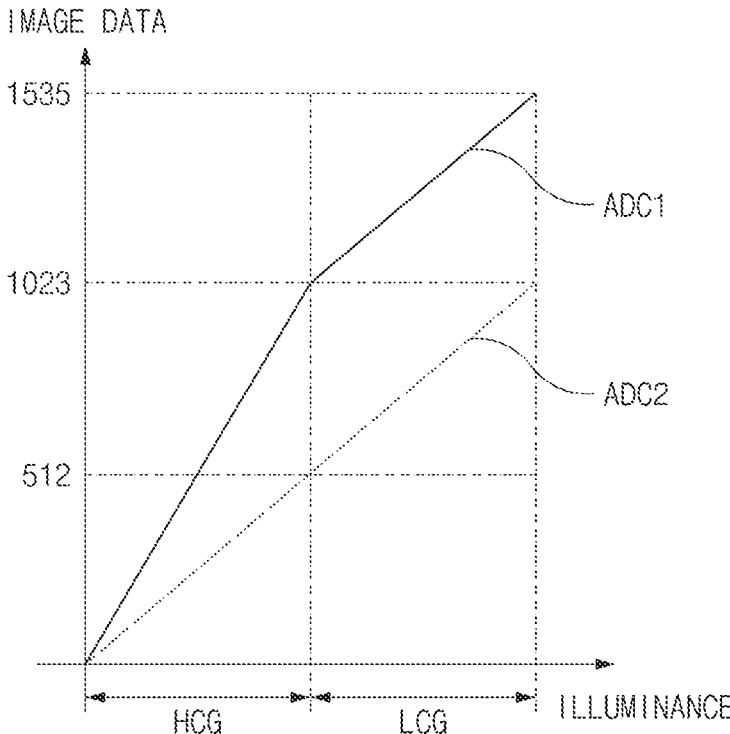

FIGS. 8A to 8C are graphs illustrating other examples of a method for allowing the image signal processor (ISP) to generate a high dynamic range (HDR) image using the image data of FIG. 6 based on some implementations of the disclosed technology.

Referring to FIGS. 8A to 8C, it is assumed that the image sensing device 100 includes two ADCs within the ADC 140 in FIG. 2, e.g., one ADC (hereinafter referred to as a first ADC or ADC1) for generating the image data of FIG. 6 (or FIG. 8A) and the other ADC (hereinafter referred to as a second ADC or ADC2) for generating image data of FIG. 8B. In some implementations, the first ADC and the second ADC included in the ADC 140 of FIG. 2 may be sequentially operated in the second readout section of FIG. 5 under the control of the timing controller 170. For example, a switch controlled by the timing controller 170 may be connected between a single output line of the CDS 130 and the first and second ADCs of the ADC 140. In the second readout section, the timing controller 170 may control the switch such that one of the first ADC (ADC1) and the second ADC (ADC2) is sequentially connected to the output line.

The first ADC (ADC1) and the second ADC (ADC2) may have different analog gains. Here, the analog gain may refer to the ratio of image data obtained by conversion of the pixel signal to an input pixel signal. For example, the analog gain may be controlled by adjusting the slope of a ramp signal applied to the ADC, but the scope of the disclosed technology is not limited thereto.

In some implementations of the disclosed technology, the analog gain of the first ADC (ADC1) may be higher than that of the second ADC (ADC2). For example, the analog gain of the first ADC may be twice the analog gain of the second ADC as illustrated in the example in FIGS. 8A and 8B. That is, for the same pixel signal, the value of the image data output by the first ADC (ADC1) may be twice the value of the image data output by the second ADC (ADC2).

The ISP 300 may receive the image data of FIGS. 8A and 8B, and may determine whether each of the received image data is image data generated in any one of the HCG mode and the LCG mode. That is, the gain processing unit 310 of the ISP 300 may determine a gain that is applied to each image data based on the value of the image data. In the example of FIGS. 8A to 8C, it is assumed that the operation of the gain processing unit 310 is performed only for the image data of FIG. 8B in order to reduce the number of calculation times of the image composition unit 320, but the scope or spirit of the disclosed technology is not limited thereto. In other implementations of the disclosed technology, the operation of the gain processing unit 310 may also be performed on the image data of FIG. 8A.

In the example of FIG. 8B, when the value of the image data corresponds to 0 to 511, the image data refers to image data generated in the HCG mode, so that the gain processing unit 310 may determine the gain that is applied to each image to be "1". In addition, when the value of the image data corresponds to 512 to 768, the image data refers to image data generated in the LCG mode, the gain processing unit 310 may determine a gain that is applied to the image data to be '2'.

Here, the gain may be a correction value for slope adjustment for adjusting the slope of the graph of image data with respect to illuminance of the pixel operating in the HCG mode to be equal to the slope of image data with respect to illuminance of the pixel operating in the LCG mode.

The image composition unit 320 of the ISP 300 may generate an HDR image (ADC2) by calculating the gain provided from the gain processing unit 310 in association with the image data of the second ADC (ADC2), with respect to the image data of pixels operating in the HCG mode and/or the image data of pixels operating in the LCG mode, thereby forming an HDR image (ADC2) for the second ADC (ADC2). For example, the above calculation (or operation) may be a multiplication operation, and when the gain is set to '1', the image composition unit 320 may omit the corresponding calculation (or operation). For example, the HDR image (ADC2) generated by the image composition unit 320 may have the range of 0 to 1023.

In some implementations, the image composition unit 320 may omit a gain operation with respect to the image data of the first ADC, and may use the image data of FIG. 8A as the HDR image (ADC1) based on the digital output from the first ADC.

The image composition unit 320 may synthesize an HDR image using the HDR image (ADC1) for the first ADC (ADC1) and the HDR image (ADC2) for the second ADC (ADC2). For example, the image composition unit 320 may synthesize an HDR image by summing the HDR image (ADC1) for the first ADC and the HDR image (ADC2) for the second ADC, or may synthesize an HDR image by applying the sum of the weights of two images ADC1 and ADC2 in different ways according to at least one criterion (e.g., illuminance), but the scope of the disclosed technology is not limited thereto.

As can be seen from FIG. 8C, the HDR image (ADC1) for the first ADC and the HDR image (ADC2) for the second ADC may be respectively generated by the first ADC and the second ADC which have different analog gains for the same pixel signal, so that the HDR image (ADC1) for the first ADC and the HDR image (ADC2) for the second ADC may appear as different image data. The HDR image (ADC1) for the first ADC may obtain data amplified by a relatively high analog gain, so that noise can be suppressed in low-illuminance conditions. The HDR image (ADC2) for the second ADC may obtain data suppressed by a relatively low analog gain, so that image data that is not saturated under high-illuminance conditions can be obtained.

Accordingly, as the image composition unit 320 synthesizes the HDR image (ADC1) for the first ADC and the HDR image (ADC2) for the second ADC, distortion of image data can be further prevented.

As is apparent from the above description, the image sensing device based on some implementations of the disclosed technology can obtain a high dynamic range (HDR) image by performing image capture only once (e.g., pressing the shutter only once) using pixels in which a mode is automatically changed to another mode.

The embodiments of the disclosed technology may provide a variety of effects capable of being directly or indirectly recognized through the above-mentioned patent document.

Although a number of illustrative embodiments have been described, it should be understood that modifications and enhancements to the disclosed embodiments and other embodiments can be devised based on what is described and/or illustrated in this patent document.

What is claimed is:

1. An imaging device comprising:
a plurality of image sensing pixels structured to detect incident light to generate pixel signals indicative of the detected incident light on the plurality of image sensing pixels, respectively;
an analog-to-digital converter coupled to receive the pixel signals from the image sensing pixels and configured to convert the pixel signals into image data representing an image in the detected incident light; and
an image signal processor coupled to receive the image data and configured to generate a high dynamic range image based on the image data,
wherein each of the image sensing pixels includes:
a photoelectric conversion element configured to generate photocharge corresponding to the detected incident light at the image sensing pixel;
a floating diffusion region coupled to the photoelectric conversion element to accumulate the generated photocharge; and
a dual conversion gain circuit that includes a P-channel Metal Oxide Semiconductor (PMOS) transistor and is coupled to the floating diffusion region to provide additional capacitance to the floating diffusion region,
wherein a gate of the PMOS transistor is coupled to the floating diffusion region, and
wherein the dual conversion gain circuit is structured so that:
a drain of the PMOS transistor receives a power-supply voltage of the image sensing pixel; and
a source of the PMOS transistor receives a ground voltage.

2. The imaging device according to claim 1, wherein:
a drain of the PMOS transistor is coupled to the floating diffusion region.

3. The imaging device according to claim 2, wherein the dual conversion gain circuit in each of the image sensing pixels further includes:
a capacitor which is coupled to a source of the PMOS transistor.

4. The imaging device according to claim 3, wherein the dual conversion gain circuit is structured so that the additional capacitance provided to the floating diffusion region corresponds to a sum of a parasitic capacitance value of the PMOS transistor and a capacitance value of the capacitor for dual conversion gain.

5. The imaging device according to claim 1, wherein the dual conversion gain circuit is structured so that the additional capacitance provided to the floating diffusion region corresponds to a parasitic capacitance value of the PMOS transistor.

6. The imaging device according to claim 1, wherein the dual conversion gain circuit is structured so that the PMOS transistor is turned off in a case that a voltage of the floating diffusion region is higher than a threshold voltage of the PMOS transistor.

7. The imaging device according to claim 6, wherein the dual conversion gain circuit is structured so that the PMOS transistor is turned on in a case that the voltage of the floating diffusion region is lower than or equal to the threshold voltage of the PMOS transistor.

8. The imaging device according to claim 7, wherein the dual conversion gain circuit is structured so that:
the capacitance of the floating diffusion region in a state in which the PMOS transistor is turned on is greater than the capacitance of the floating diffusion region in a state in which the PMOS transistor is turned off.

9. The imaging device according to claim 1, wherein:
the image signal processor is configured to determine:
a conversion gain for image data that is generated in a low conversion gain mode in which the additional capacitance is provided to the floating diffusion region; and
a conversion gain for image data that is generated in a high conversion gain mode in which the additional capacitance is not provided to the floating diffusion region.

10. The imaging device according to claim 9,
wherein the image signal processor is configured to calculate the gain for at least one of the image data generated in the low conversion gain mode and the image data generated in the high conversion gain mode.

11. The imaging device according to claim 1, wherein the analog-to-digital converter includes:
a first analog-to-digital converter operable to output first image data with a first analog gain from an image pixel signal from an image sensing pixel; and
a second analog-to-digital converter configured to have a smaller analog gain than the first analog gain of the first analog-to-digital converter and to output second image data with the smaller gain from the image pixel signal from the image sensing pixel,
wherein the image signal processor receives the first image data and second image data for the same image pixel signal from the image sensing pixel and is configured to generate a high dynamic range image based on the first image data and the second image data.

12. The imaging device according to claim 11, wherein:
the image signal processor is configured to synthesize the first image data generated by the first analog-to-digital converter and the second image data generated by the second analog-to-digital converter.

13. An image sensing device comprising:
a plurality of image sensing pixels, each image sensing pixel detect incident light to generate a pixel signal indicative of the detected incident light; and
an analog-to-digital converter configured to convert the pixel signal into image data,
wherein each of the image sensing pixels includes:
a photoelectric conversion element configured to generate photocharge corresponding to the detected incident light;
a floating diffusion region configured to accumulate the generated photocharge at the floating diffusion region; and
a P-channel Metal Oxide Semiconductor (PMOS) transistor coupled to the floating diffusion region to produce a dual conversion gain and to provide additional capacitance to the floating diffusion region,
wherein the PMOS transistor is turned off in a case that a voltage of the floating diffusion region is higher than a threshold voltage of the PMOS transistor.

14. The image sensing device according to claim 13, wherein:

a gate of the PMOS transistor is coupled to the floating diffusion region.

15. The image sensing device according to claim 13, wherein:

a drain of the PMOS transistor is coupled to the floating diffusion region.

16. The image sensing device according to claim 13, wherein the PMOS transistor is turned on in a case that the voltage of the floating diffusion region is lower than or equal to the threshold voltage of the PMOS transistor.

17. An image sensing device comprising:

a photoelectric conversion element configured to detect incident light to generate photocharge corresponding to the detected incident light;

a floating diffusion region coupled to the photoelectric conversion element to accumulate the generated photocharge at the floating diffusion region; and a dual conversion gain transistor configured to provide additional capacitance to the floating diffusion region, and including a gate connected to the floating diffusion region, wherein the dual conversion gain transistor is turned on or turned off in response to a voltage of the floating diffusion region, wherein the dual conversion gain transistor is a P-Chanel Metal Oxide Semiconductor (PMOS) transistor, and wherein the PMOS transistor is turned off in a case that a voltage of the floating diffusion region is higher than a threshold voltage of the PMOS transistor.

\*   \*   \*   \*   \*